United States Patent

Okahara et al.

[11] Patent Number: 5,249,482
[45] Date of Patent: Oct. 5, 1993

[54] RATIO CONTROL FOR CONTINUOUSLY VARIABLE TRANSMISSION

[75] Inventors: Hirofumi Okahara, Isehara; Yutaka Suzuki, Atsugi, both of Japan

[73] Assignee: Nissan Motor Co., Ltd., Yokohama, Japan

[21] Appl. No.: 829,471

[22] Filed: Feb. 3, 1992

[30] Foreign Application Priority Data

Feb. 1, 1991 [JP] Japan .................. 3-33574

[51] Int. Cl.⁵ .................................. F16H 61/00
[52] U.S. Cl. .................................. 74/866
[58] Field of Search ............... 74/866; 364/424.1

[56] References Cited

U.S. PATENT DOCUMENTS

| | | | |
|---|---|---|---|
| 4,735,113 | 4/1988 | Yamamuro et al. | 74/866 |
| 4,803,900 | 2/1989 | Ohkumo | 74/866 |
| 4,843,913 | 7/1989 | Miyawaki | 74/866 X |
| 5,009,129 | 4/1991 | Morimoto et al. | 74/866 |
| 5,020,392 | 6/1991 | Morimoto et al. | 74/866 |
| 5,042,326 | 8/1991 | Hibi et al. | 74/866 |
| 5,047,937 | 9/1991 | Vahabzadeh et al. | 74/866 X |
| 5,050,455 | 9/1991 | Yamashita et al. | 74/866 |
| 5,067,372 | 11/1991 | Suzuki | 74/866 |
| 5,092,198 | 3/1992 | Morishige et al. | 74/866 |

Primary Examiner—Dirk Wright
Attorney, Agent, or Firm—Foley & Lardner

[57] ABSTRACT

A ratio control of a continuously variable transmission according to the present invention proposes governing which position a shift actuator is to take versus a throttle opening degree and a vehicle speed in accordance with a predetermined shift pattern predetermined for various combinations of the throttle opening degree and vehicle speed, and overriding this governing step to put the actuator in motion away from a maximum reduction ratio position when the vehicle speed has satisfied a predetermined relationship with a value that has been derived from a predetermined data at acceleration.

9 Claims, 6 Drawing Sheets

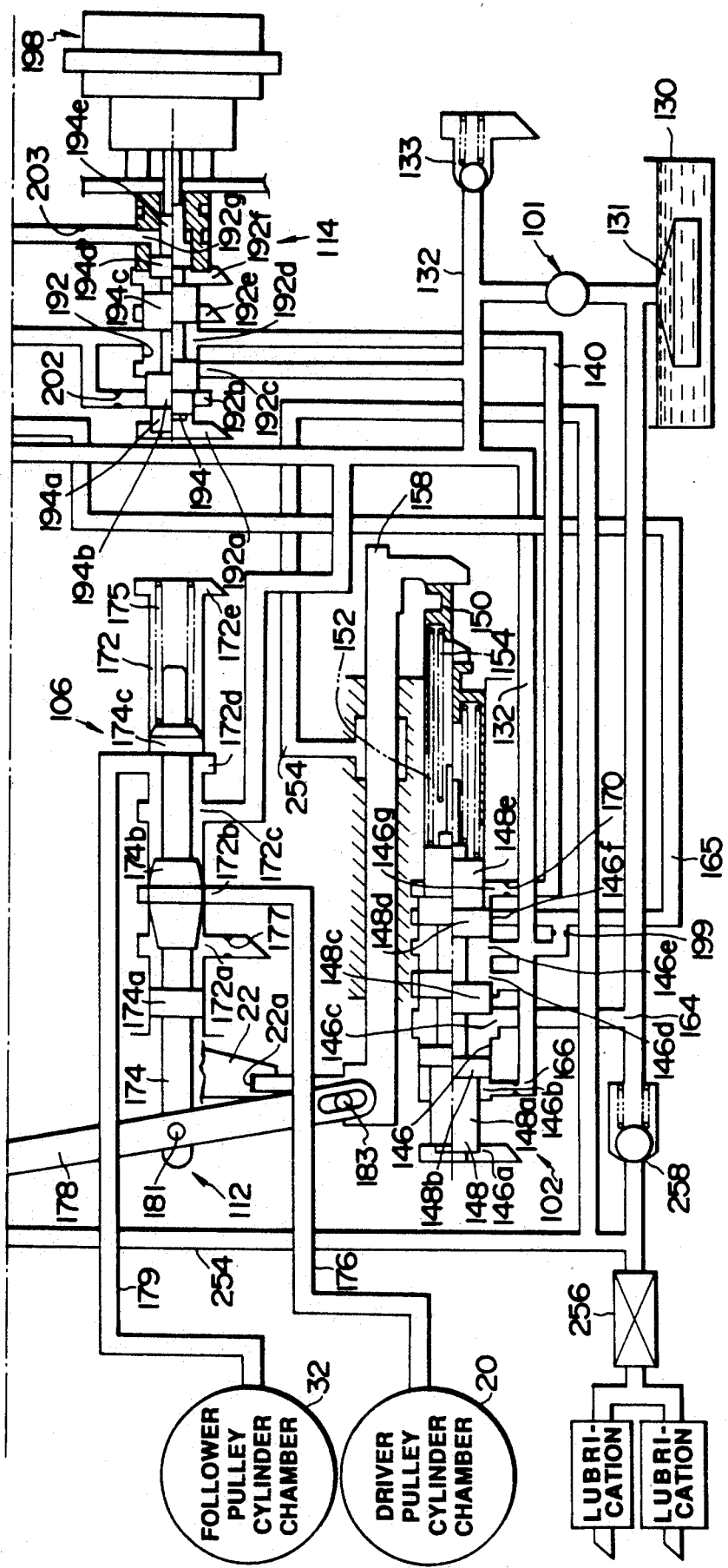

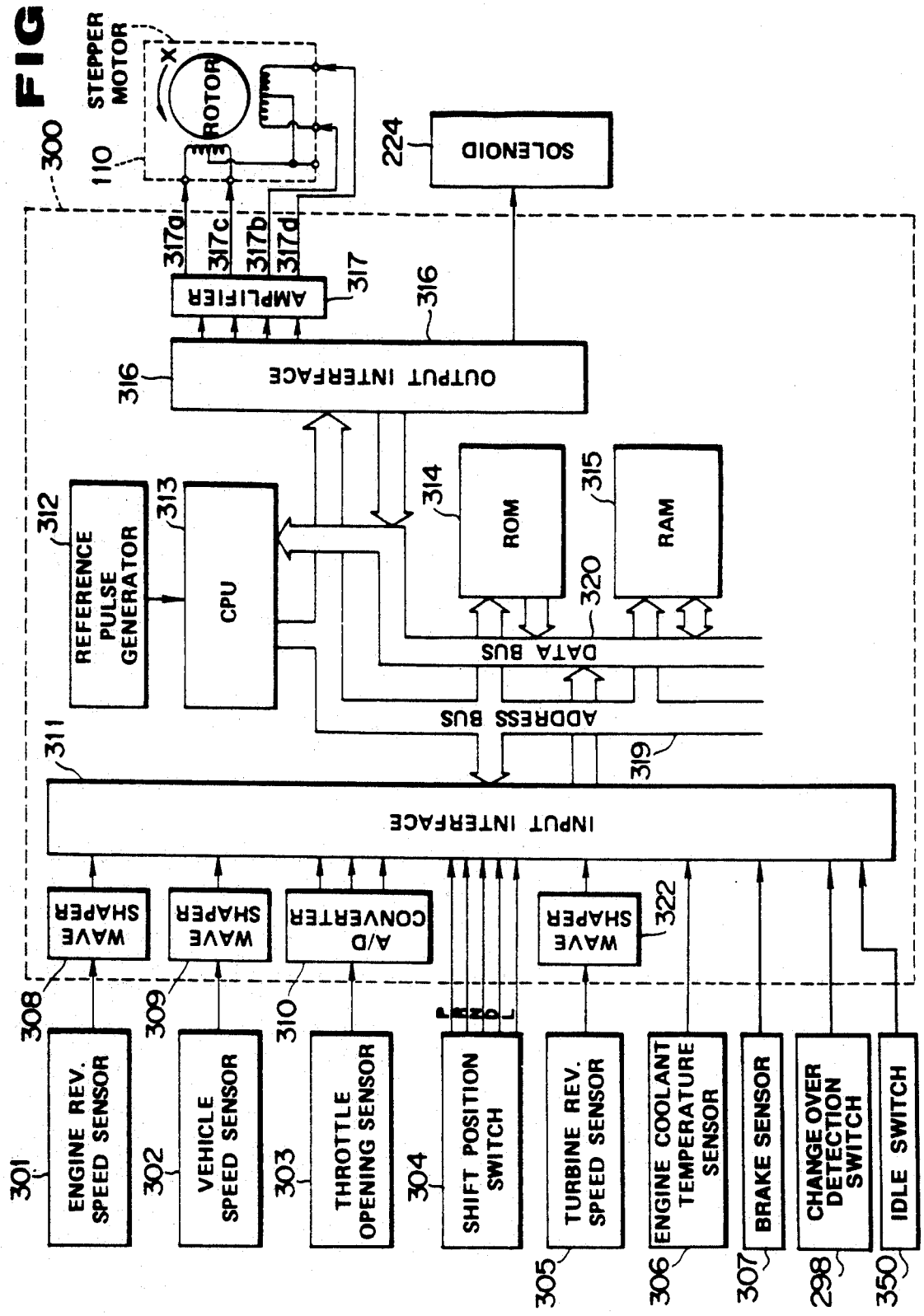

RATIO CONTROL FOR CONTINUOUSLY VARIABLE TRANSMISSION

BACKGROUND OF THE INVENTION

The present invention relates to a ratio control for a continuously variable transmission.

U.S. Pat. No. 4,735,113 issued on Apr. 5, 1988 to Yamamuro et al. discloses a ratio control of a continuously variable transmission which maintains the maximum reduction ratio in response to a shift actuator held at the corresponding maximum reduction ratio position, but effects an upshift from the maximum reduction ratio in response to a motion of the shift actuator in a direction away from the corresponding maximum reduction ratio position. A control unit stores a predetermined shift pattern which provides a target value in the turbine revolution speed versus one of various combinations of throttle opening degree and vehicle speed values and governs which position the shift actuator is to take in accordance with this predetermined shift pattern.

According to this known ratio control, the limit is imposed on suppressing overshoot in turbine revolution speed at rapid acceleration of the vehicle from a standstill after the throttle opening degree has been increased rapidly. This is derived from the fact that the maximum reduction ratio is kept until the vehicle speed reaches an upshift vehicle speed predetermined by the shift pattern and thus the turbine revolution speed is subject to a rapid increase in the vicinity of this upshift vehicle speed.

An object of the present invention is to improve a ratio control such that the overshoot mentioned above is suppressed or reduced satisfactorily.

SUMMARY OF THE INVENTION

According to one aspect of the present invention, there is provided a system for a ratio control of a continuously variable transmission which maintains a predetermined reduction ratio in response to a shift actuator held at a predetermined position, but effects a shift from the predetermined reduction ratio in response to motion of the shift actuator from said predetermined position, the system comprising: means for governing which position the shift actuator is to take versus operating parameters in accordance with a predetermined shift pattern predetermined for various combinations of said operating parameters; and means overriding said governing means for putting the actuator in motion away from said predetermined position when one of said operating parameter has satisfied a predetermined relationship with a value that has been derived from a predetermined data under a predetermined condition.

According to another aspect of the present invention, there is provided a method of a ratio control of a continuously variable transmission which maintains a predetermined reduction ratio in response to a shift actuator held at a predetermined position, but effects a shift from the predetermined reduction ratio in response to motion of the shift actuator from said predetermined position, the method comprising the steps of: governing which position the shift actuator is to take versus operating parameters in accordance with a predetermined shift pattern predetermined for various combinations of said operating parameters; and overriding said governing step and putting the actuator in motion away from said predetermined position when one of said operating parameters has satisfied a predetermined relationship with a value that has been derived from a predetermined data under a predetermined condition.

BRIEF DESCRIPTION OF THE DRAWINGS

FIGS. 2A and 2B, when combined, are a hydraulic circuit of a control system for the continuously variable transmission;

FIG. 3 is a block diagram of a control unit;

DETAILED DESCRIPTION OF THE INVENTION

Figure 1:
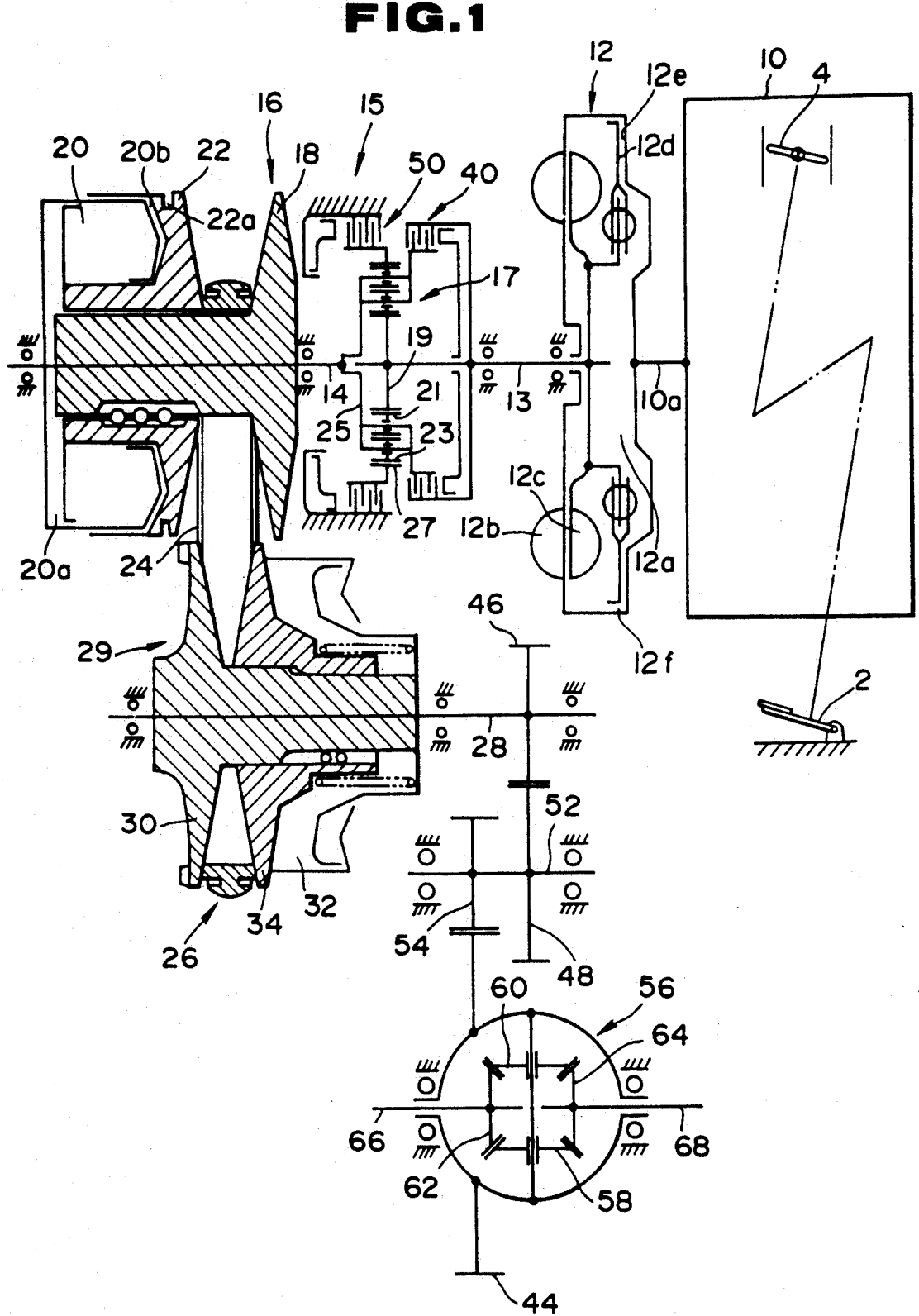
FIG. 1 shows in block diagram an internal combustion engine and a continuously variable transmission having a pair of output axles drivingly coupled with the pair of front wheels of the vehicle shown in FIG. 1A.
Figure 2A:
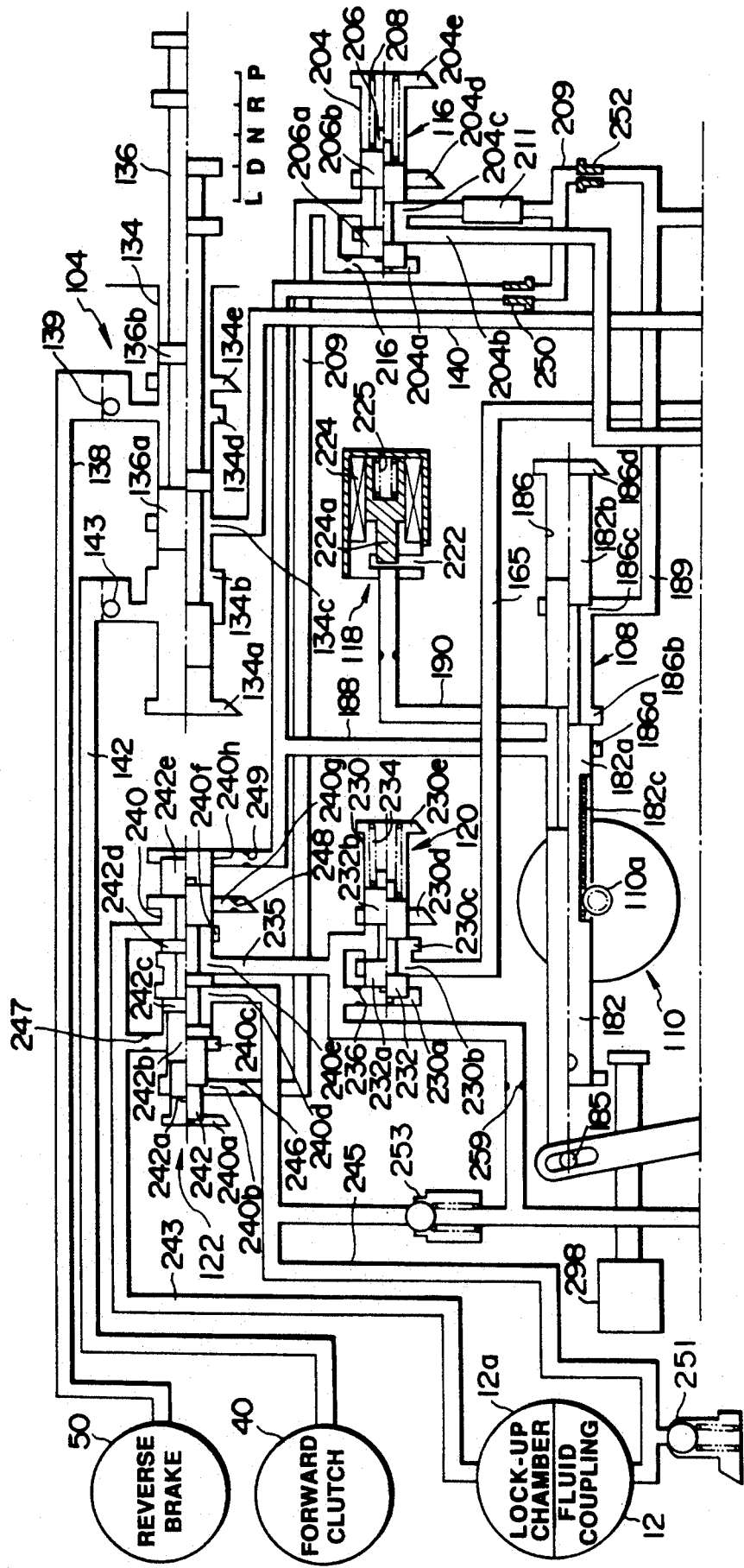

Referring to FIG. 1, there is shown a portion of an automotive vehicle having mounted thereon an internal combustion engine with a throttle valve 4 which opens in degrees as an accelerator pedal 2 is depressed. The throttle opening degree is proportional to a power demand set by a driver of the vehicle. The internal combustion engine 10 is followed by a continuously variable transmission of the V-belt type. Alternatively, a continuously variable transmission of the traction drive type may be used. A reduction ratio established in the continuously variable transmission is controlled by a shift actuator in the form of a stepper motor 110 which is under the control of a control unit 300 shown in FIG. 3. In FIGS. 2A and 2B, there is shown a hydraulic circuit of a control system. In FIG. 3, the control unit 300 is shown which is interfaced with a vehicle speed sensor 302 which is a speed sensor mounted to the output member of the transmission. Also coupled with the control unit 300 is a throttle sensor 303 which detects the opening degree of the throttle valve 4 which is indicative of load imposed on the engine 10 and generates a load indicative signal indicative of the throttle opening degree detected. A turbine speed sensor 305 detects an actual value in turbine revolution speed and generates a turbine revolution speed indicative signal indicative of the actual value in turbine revolution speed detected. With the same vehicle speed, if there is initiated a shift toward the maximum reduction ratio, the turbine revolution speed starts to increase. Thus, the turbine revolution speed is a reduction ratio dependent variable.

Detailed description of FIGS. 1, 2A, 2B and 3 is found in a copending U.S. patent application Ser. No. 07/563,309, new U.S. Pat. No. 5,067,372 filed on Aug. 7, 1990 assigned to the same assignee to which the present application is to be assigned, which copending application is hereby incorporated by reference in its entirety. For further understanding, reference is made to this copending United States Patent Application.

The manner of operation of a ratio control to meet a rapid acceleration demand is explained below.

Figure 5:
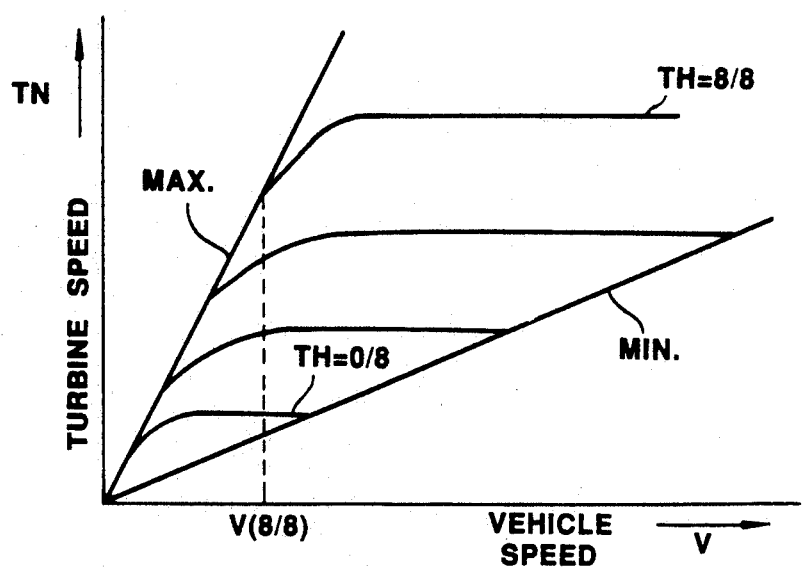
FIG. 5 is a shift pattern diagram.

Before entering into the discussion regarding the ratio control to meet a rapid acceleration, a ratio control during a slow acceleration is considered with reference to FIG. 5. For ease of explanation, it is now assumed that as the throttle opening degree increases gradually from the closed position (0/8) to the fully opened position (8/8) at a gradual rate, the vehicle is accelerated to increase its speed and the turbine speed increases accordingly to keep a ratio of the turbine revolution speed to the vehicle speed proportional to the maximum reduction ratio. After the throttle opening degree TH has increased to the fully open position (8/8), at vehicle speeds below a predetermined upshift vehicle speed V(8/8) for operation with fully open throttle (TH=8/8), the maximum reduction ratio is kept. This situation continues until the vehicle speed reaches the predetermined upshift vehicle speed V(8/8). Immediately after the vehicle speed increases beyond this vehicle speed V(8/8), the continuously variable transmission initiates upshift from the maximum reduction ratio toward a smaller reduction ratio. While maintaining the predetermined relationship between the turbine speed and vehicle speed, the reduction ratio decreases toward the minimum reduction ratio as the vehicle speed increases beyond V(8/8).

From the above discussion, it is readily understood that with the shift pattern shown in FIG. 5, the continuously variable transmission is kept at the maximum reduction ratio at vehicle speed below the predetermined upshift vehicle speed V(8/8) if the throttle opening degree TH is increased to the fully open position (TH=8/8). The setting of this upshift vehicle speed V(8/8) is acceptable except in the case when there occurs a rapid acceleration immediately after the vehicle start moving from a standstill. In this case, since the maximum reduction ratio is kept until the vehicle speed reaches the vehicle speed V(8/8) if the throttle opening degree has increased to the fully open position, the turbine speed is subject to overshoot and the subsequent downshoot being before stabilized immediately after the vehicle speed exceeds V(8/8).

Figure 6:
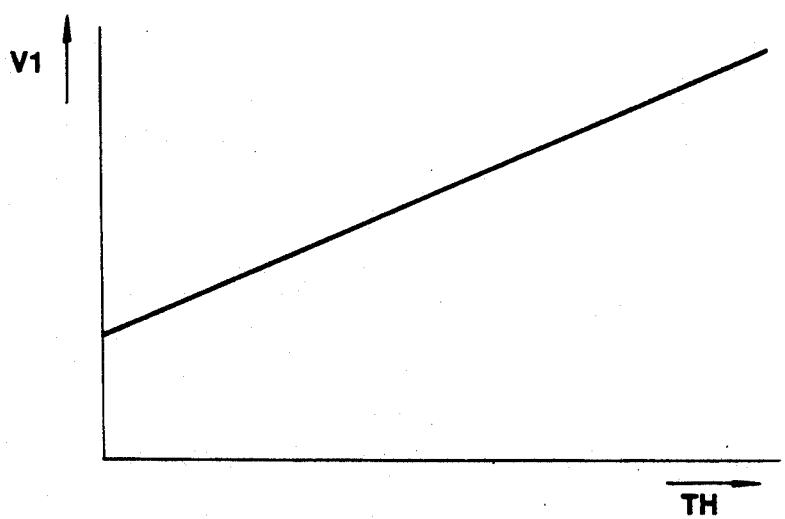
FIG. 6 is a line interconnecting upshift vehicle speed values (V1) versus throttle opening degrees (TH)
Figure 7:
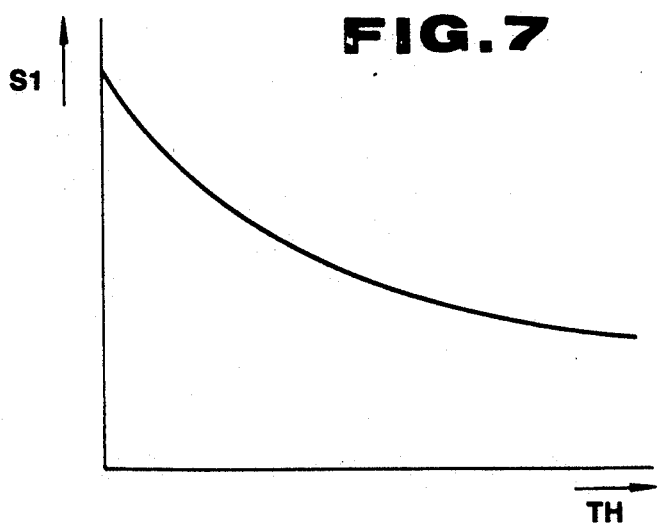
FIG. 7 is a curve interconnecting ramp reduction ratios (S1).

In order to reduce this overshoot phenomena of the turbine speed, the continuously variable transmission is allowed to upshift from the maximum reduction ratio upon arriving at an upshift vehicle speed value determined using the data shown in FIG. 6 to a small reduction ratio S1 determined using the data shown in FIG. 7. From FIG. 6, it is readily seen that the upshift vehicle speed value V1 is proportional to the throttle opening degree TH. With the same throttle opening degree, the upshift vehicle speed value V1 determined out of the data shown in FIG. 6 is lower than the predetermined upshift vehicle speed on the shift pattern shown in FIG. 5. For example, with TH=8/8, the upshift vehicle speed value V1(8/8) is lower than the predetermined upshift vehicle speed V(8/8). Determined from FIG. 7 is a ramp reduction ratio S1 which the continuously variable is to upshift upon arriving at the upshift vehicle speed value V1.

Figure 4:
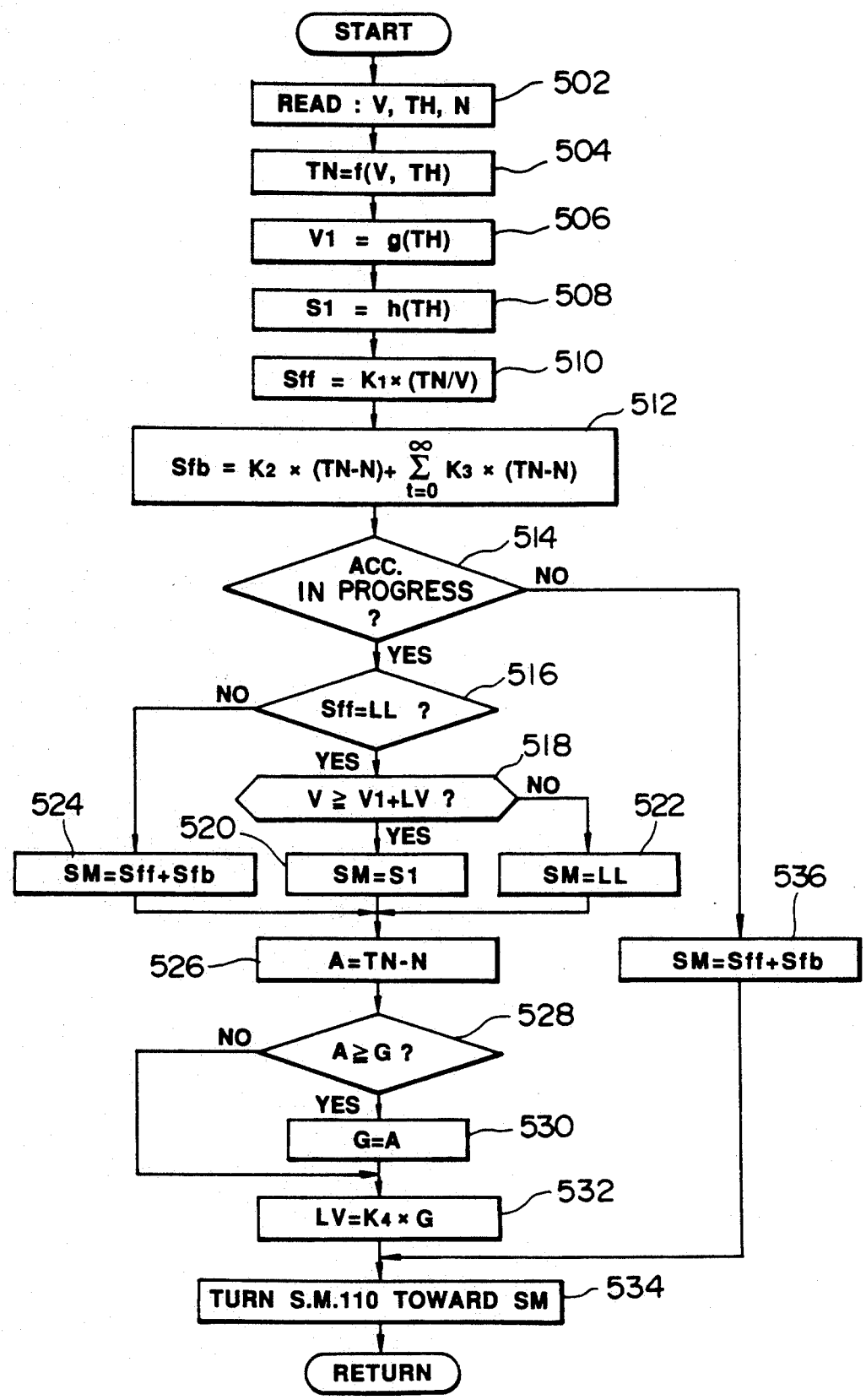
FIG. 4 is a flow diagram.

The operation is further explained along with the flow diagram shown in FIG. 4.

In FIG. 4, at a step 502, reading operations are performed out of sensor signals of the vehicle speed sensor 302, throttle sensor 303 and turbine speed sensor 305 and the results are stored as a vehicle speed data V, a throttle opening degree data TH and an actual value in turbine revolution speed data N, respectively. At a step 504, a table look-up operation of the data shown in FIG. 5 is performed using the data V and TH to determine a target value in turbine revolution speed TN which may be expressed by a function TN=f(V, TH). At a step 506, a table look-up operation of the data shown in FIG. 6 is performed using the data TH to determine an upshift vehicle speed value V1 which may be expressed by a function V1=g(TH). At a step 508, a table look-up operation of the data shown in FIG. 7 is performed using the data TH to determine a ramp reduction ratio S1 which may be expressed by a function S1=h(TH). At a step 510, a feed forward control value Sff as expressed by the following equation is determined using the data TN and V. That is, $$Sff = K1 \times (TN/V) \qquad (1)$$

where, K1: a constant.

At a step 512, a feed back control value Sfb as expressed by the following equation is determined using the data TN and N. That is, $$Sfb = K2 \times (TN - N) + \sum_{t=0}^{\infty} K3 \times (TN - N) \qquad (2)$$

where, K2: a constant and
K3: a constant.

After this step 512, there is an interrogation whether a rapid acceleration demand beyond a predetermined degree is in progress. If this is the case, there has occurred a rapid acceleration demand and the routine proceeds to a step 516. At the step 516, there is another interrogation whether the feed forward value Sff is equal to a predetermined value LL. This predetermined value LL is a fixed value resulting from a product of K1 and TN/V that is established when the continuously variable transmission is at the maximum reduction ratio. Thus, what is meant by the fact that Sff=LL is that an operation point is on the line MAX. in FIG. 5. If the interrogation at the step 516 results in affirmative, there is another interrogation at a step 518 whether the vehicle speed data V is greater or higher than the upshift vehicle speed value V1 that is increased by a result LV resulting from a learning operation performed subsequently along steps 526, 528, 530 and 532. For ease of explanation, it is now assumed that there is no such learning operation and the value LV is always zero. If the interrogation at the step 518 results in affirmative, the ramp reduction ratio S1 is set as a stepper motor target position SM. At a step 534, a driver circuit is energized to turn the stepper motor 110 toward the target position SM.

If the interrogation at the step 518 results in negative, the routine proceeds to a step 522 where the value LL is set as the stepper motor target position SM before the routine reaches the step 534. If the interrogation at the step 516 results in negative, the routine proceeds to a step 524 where the sum of Sff and Sfb is set as the stepper motor target position SM. If the interrogation at the step 514 results in negative, the routine proceeds to a step 536 where the sum of Sff and Sfb is set as the target stepper motor position SM. At the step 534, the driver circuit is energized to turn the stepper motor toward the stepper motor position SM=Sff+Sfb following the step 536 or 524.

From the preceding explanation along with the flow diagram, it will now be appreciated that while the rapid acceleration demand is present, initially the maximum reduction ratio is kept until the vehicle speed V is still lower than V1 (a flow along steps 514, 516, 518, 522 and 534), and subsequently after the vehicle speed V exceeds V1, an upshift toward the ramp reduction ratio S1 is initiated (a flow along steps 514, 516, 518, 520 and 534).

The value LV resulting from the before-mentioned learning operation is explained. After the step 520 or 522 or 524, an accumulator A is updated by an error resulting from subtraction of N from TN. There is an interrogation at the step 528 whether the content of the accumulator A is greater than a value G. If this is the case, the value is updated by the current content of the accumulator A at the step 530. If the interrogation at the step 528 results in negative, the routine proceeds to the step 532 bypassing the step 530. It will be appreciated that G always contains the maximum value of the error (TN−N). At the step 532, the value LV is updated with the product of K4 (K4: a constant) and G. In this manner the value LV used at the step 518 is updated if in any of the previous routine the error has established a new maximum value.

From the preceding description, it will now be readily understood that if the vehicle is at acceleration with the continuously variable transmission kept at the maximum reduction ratio, the stepper motor 110 turns to the target position S1 after the vehicle speed V has exceeded the upshift vehicle speed value V1 and subsequently the feed forward value Sff starts to change owing to further increase in the vehicle speed, the stepper motor 110 turns toward the target position determined as the sum of Sff and Sfb. Turning the stepper motor to S1 before the feed forward value Sff starts changing is effective in suppressing overshoot of the turbine speed.

Since the upshift vehicle speed value V1 is increased by LV and this value is increased after the error (TN−N) surpassed the previous maximum, the amount of overshoot is more effectively suppressed.

What is claimed is:

1. A system for a ratio control of a continuously variable transmission comprising:
    a shift actuator having a predetermined position and moveable away from said predetermined position;
    means for conditioning the continuously variable transmission in a predetermined reduction ratio in response to said shift actuator held at said predetermined position;
    means for governing which position said shift actuator is to take versus operating parameters in accordance with a predetermined shift pattern predetermined for various combinations of said operating parameters;
    means for interrogating whether said shift actuator takes said predetermined position; and
    means overriding said governing means at least when said shift actuator takes said predetermined position for holding said shift actuator at said predetermined position when one of said operating parameters fails to satisfy a predetermined relationship with a predetermined value, but putting said actuator in motion away from said predetermined position when said one of said operating parameters has satisfied said predetermined relationship with said predetermined value.

2. A system as claimed in claim 1, wherein said value is subject to correction.

3. A method of a ratio control of a continuously variable transmission which maintains a predetermined reduction ratio in response to a shift actuator held at a predetermined position, but effects a shift from the predetermined reduction ratio in response to motion of the shift actuator from said predetermined position, the method comprising the steps of:
    governing which position the shift actuator is to take versus operating parameters in accordance with a predetermined shift pattern predetermined for various combinations of said operating parameters;
    interrogating whether the shift actuator takes the predetermined position; and
    holding the shift actuator at said predetermined position when one of said operating parameters fails to satisfy a predetermined relationship with a predetermined value when at least the shift actuator takes the predetermined position; and
    allowing a shift in motion of the actuator away from the predetermined position to a ramp position when said one of said operating parameters has satisfied said predetermined relationship with said predetermined value.

4. A method as claimed in claim 3, further comprising the step of subjecting said value to correction.

5. A method of a ratio control of a continuously variable transmission which maintains a predetermined maximum reduction ratio in response to a shift actuator held at a predetermined position, but effects a shift from the predetermined maximum reduction ratio in response to motion of the shift actuator from the predetermined position, the continuously variable transmission being drivingly connected to an engine of an automotive vehicle, the engine having a throttle valve which opens in degrees, the method comprising the steps of:
    detecting a throttle opening degree of the throttle valve and generating a throttle opening degree indicative signal indicative of said throttle opening degree detected;
    detecting a vehicle speed of the automotive vehicle and generating a vehicle speed indicative signal indicative of said vehicle speed detected;
    governing which position the shift actuator is to take versus said throttle opening degree and vehicle speed indicative signals in accordance with a predetermined shift pattern predetermined for various combinations of said throttle opening degree and vehicle speed;
    holding the shift actuator at the predetermined position when said vehicle speed indicative signal is less than a predetermined value; and
    allowing a shift in motion of the shift actuator away from the predetermined position to a ramp reduction ratio position when said one of said vehicle speed indicative signal fails to be less than the predetermined value.

6. A method as claimed in claim 5, further comprising the step of updating said predetermined value with the maximum of previous occurrence in error in a predetermined reduction ratio dependent variable.

7. A method as claimed in claim 5, further comprising the step of determining said predetermined value in response to said throttle opening degree indicative signal.

8. A method as claimed in claim 7, further comprising the steps of calculating the maximum of previous occurrence in error in a predetermined reduction ratio dependent variable and updating said predetermined value with the calculated maximum.

9. A method as claimed in claim 7, further comprising the step of determining said ramp reduction ratio position in response to said throttle indicative signal.

* * * * *